(12) United States Patent
Vinogradov

(10) Patent No.: US 11,262,579 B1
(45) Date of Patent: Mar. 1, 2022

(54) OPTICAL ARRANGEMENT OF ADAPTIVE ILLUMINATION SYSTEM WITH VARIABLE ILLUMINATING ANGLE AND VCM MOTOR

(71) Applicant: ZEBRA TECHNOLOGIES CORPORATION, Lincolnshire, IL (US)

(72) Inventor: Igor Vinogradov, Oakdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/009,538

(22) Filed: Sep. 1, 2020

(51) Int. Cl.
*G02B 27/30* (2006.01)
*G02B 27/00* (2006.01)
*G06K 7/10* (2006.01)
*G02B 7/02* (2021.01)
*G02B 3/00* (2006.01)

(52) U.S. Cl.
CPC ....... *G02B 27/0081* (2013.01); *G02B 3/0037* (2013.01); *G02B 7/02* (2013.01); *G02B 27/30* (2013.01); *G06K 7/10831* (2013.01)

(58) Field of Classification Search
CPC .... G02B 27/0081; G02B 7/02; G02B 3/0037; G02B 27/30; G06K 7/10831
USPC ........................................................ 359/641
See application file for complete search history.

(56) References Cited

U.S. PATENT DOCUMENTS

2003/0039036 A1* 2/2003 Kruschwitz .......... H04N 9/3161
359/707

* cited by examiner

*Primary Examiner* — James C. Jones
(74) *Attorney, Agent, or Firm* — Yuri Astvatsaturov

(57) ABSTRACT

A method and apparatus for illuminating at least one object appearing in a field of view (FOV). An illumination system includes an illumination source configured to provide illumination to illuminate a target of the object. A collimating lens is configured to collimate the illumination and to provide the illumination to a fixed multiple lens array (MLA). The fixed multiple lens array provides the illumination to a movable MLA. The movable MLA is configured to provide the illumination to the target to illuminate the target. The position of the movable MLA may be adjusted to alter the illumination full field angle.

21 Claims, 7 Drawing Sheets

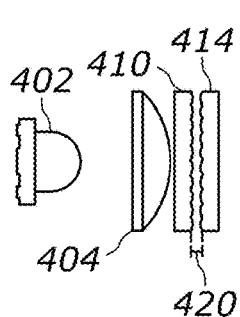 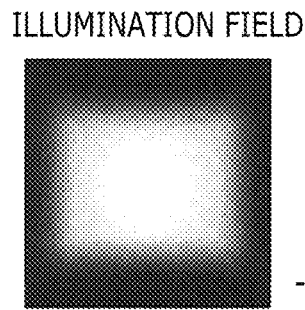 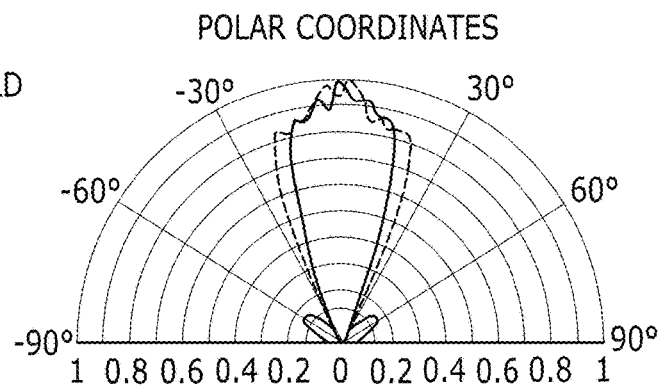
FIG. 5A  FIG. 5B  FIG. 5C
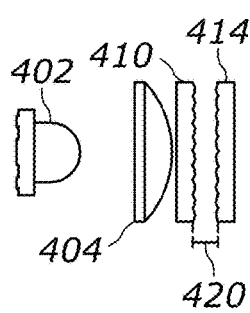 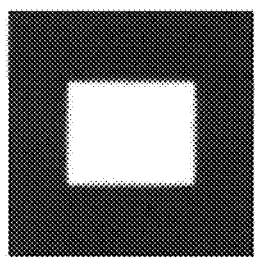 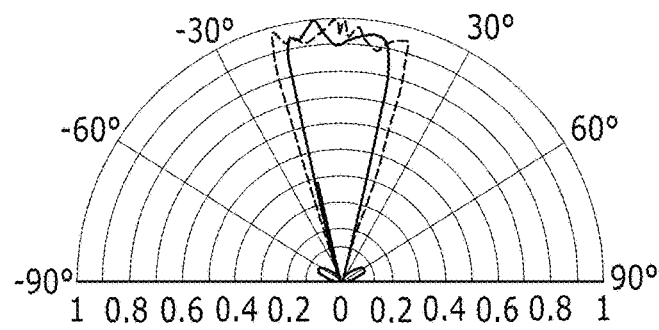
FIG. 6A  FIG. 6B  FIG. 6C
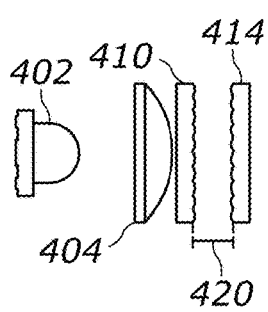 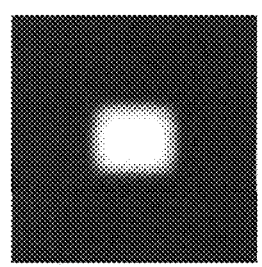 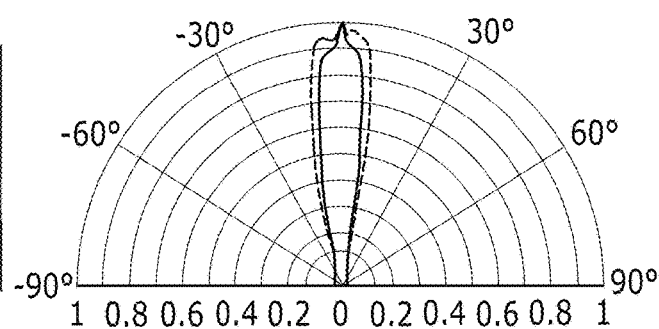
FIG. 7A  FIG. 7B  FIG. 7C

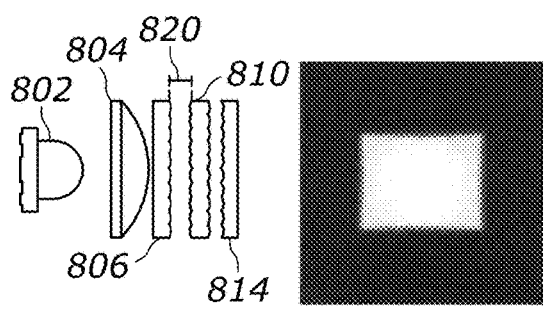
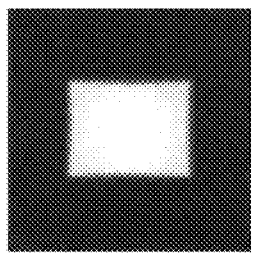
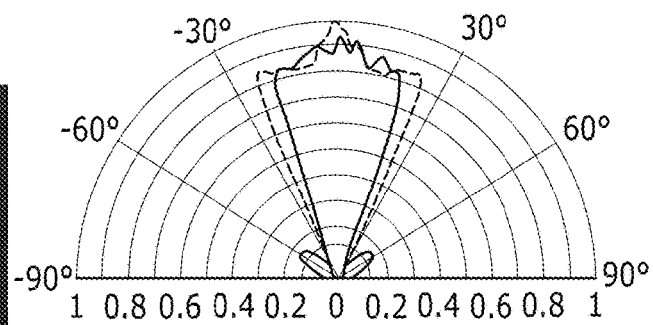
FIG. 9A  FIG. 9B  FIG. 9C
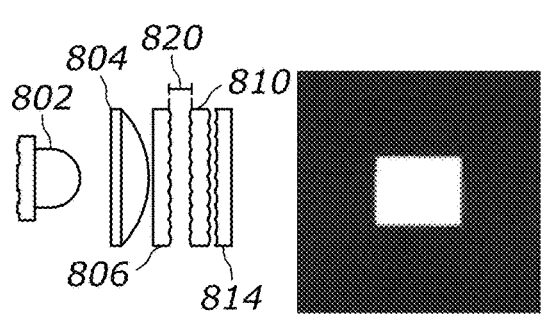
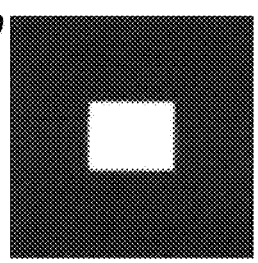
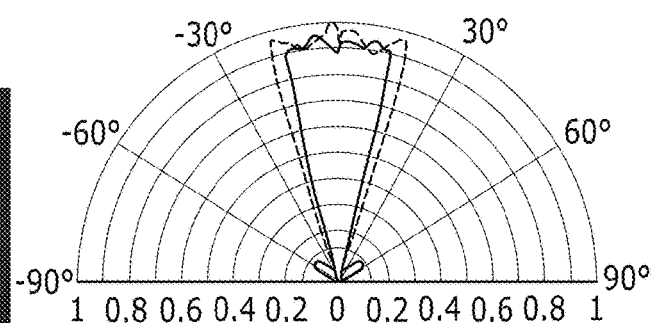
FIG. 10A  FIG. 10B  FIG. 10C
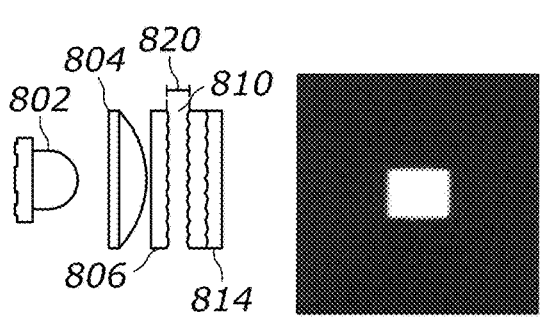
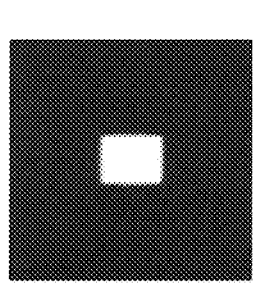
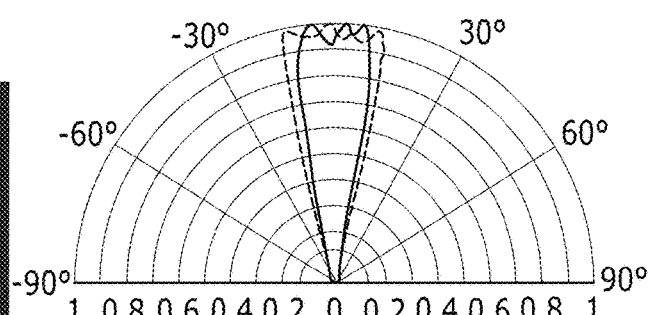
FIG. 11A  FIG. 11B  FIG. 11C

OPTICAL ARRANGEMENT OF ADAPTIVE ILLUMINATION SYSTEM WITH VARIABLE ILLUMINATING ANGLE AND VCM MOTOR

BACKGROUND OF THE INVENTION

Imaging devices generally capture images within a given field of view (FOV). It is often required that that scanning devices capture images at various distances and at various fields of view to effectively decode information in an image for use in machine vision applications. Additionally, the demand for portable sensors is increasing which requires the use of smaller sensors further requiring active alignment of the sensors necessitating an air gap between optics and the sensor. Accordingly, portable scanning devices must be capable of functioning with a wide field of view while generating sharp images over a working range for the purposes of machine vision.

Imaging barcode readers require illumination sources to illuminate a target. Compact imaging systems, such as a compact barcode reader, may require an internal illumination source which is often difficult to implement due to size, power requirements, a desired field of view (FOV), and/or illumination requires. Even further, typical auto-focus imaging systems, which can focus at a range of depths and/or FOVs, may not function efficiently with an internal or external illumination system having a fixed illumination profile. For example, it may be preferred to have a wide illumination FOV for reading a barcode at short distances, while having a narrow illumination FOV for reading barcodes at farther distances. Typical imaging systems fail at accomplishing this because many wide FOV illumination systems cannot provide enough illumination to image a target that is at a farther distance. While some systems may address these, and other issues, via a combination of complicated custom optics and bulky components, such systems are fairly complex, costly, large, and can adversely impact reliability of the device.

Accordingly, there is a need for improved systems, methods, and devices which address these issues.

SUMMARY

In an embodiment, the present invention is an optical assembly adaptive illumination of an object of interest. The optical assembly comprises an illumination source configured to provide light along an optical axis to provide illumination to a target, wherein the illumination has an illumination full field angle; a collimating lens disposed along the optical axis and configured to receive the light from the illumination source and further configured to collimate the light; a fixed multiple lens array disposed along the optical axis and configured to receive the light from the collimating lens; and a movable multiple lens array disposed along the optical axis and configured to receive the light from the fixed lens array, wherein the position of the movable multiple lens array is adjustable and the position of the movable lens array may be adjusted to change the illumination full field angle.

In a variation of the current embodiment, the optical assembly further includes a motor physically coupled to the movable multiple lens array and configured to adjust the position of the movable multiple lens array, and in an embodiment, the motor may be a voice coil motor. In a variation of the current embodiment, the movable multiple lens array may have a travel distance of between 0.2 and 1 millimeter.

In a variation of the current embodiment, the illuminating full field angle may be changed from 24 degrees to 46 degrees. In a variation of the current embodiment, the illuminating full field angle may be changed from 16 degrees to 42 degrees.

In a variation of the current embodiment, the collimating lens has a first surface along the optical axis and a second surface along the optical axis and wherein the first surface is a planar surface and the second surface is a convex surface having a positive optical power, index of refraction between 1.4 and 2, and am Abbe value of between 20 and 70.

In a variation of the current embodiment, the fixed multiple lens array comprises a first surface along the optical axis and a second surface along the optical axis, and wherein the first surface is a planar surface and the second surface comprises a plurality of lens cells.

In a variation of the current embodiment, the movable multiple lens array comprises a first surface along the optical axis and a second surface along the optical axis, and wherein the first surface comprises a plurality of lens cells and the second surface comprises a planar surface.

In a variation of the current embodiment, the optical assembly further includes a third multiple lens array disposed along the optical axis configured to receive the light from the movable multiple lens array, and wherein the third multiple lens array is further configured to provide the light to the target; and further wherein the third lens array comprises a first surface along the optical axis and a second surface along of the optical axis, and wherein the first surface comprises a plurality of concave lenses and the second surface comprises a planar surface.

In a variation of the current embodiment, the target is one of a 1D barcode, 2D barcode, QR code, UPC code, or indicia indicative of the object of interest.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5A is a cross-sectional side view of the optical assembly of FIG. 4A having a motor position distance of 0 millimeters.

FIG. 5B is an image of the illumination field of the optical configuration of FIG. 5A.

FIG. 5C is the illumination full field angle in polar coordinates for the optical configuration of FIG. 5A.

FIG. 6A is a cross-sectional side view of the optical assembly of FIG. 4A having a motor position distance of 0.5 millimeters.

FIG. 6B is an image of the illumination field of the optical configuration of FIG. 6A.

FIG. 6C is the illumination full field angle in polar coordinates for the optical configuration of FIG. 6A.

FIG. 7A is a cross-sectional side view of the optical assembly of FIG. 4A having a motor position distance of 1 millimeter.

FIG. 7B is an image of the illumination field of the optical configuration of FIG. 7A.

FIG. 7C is the illumination full field angle in polar coordinates for the optical configuration of FIG. 7A.

FIG. 9A is a cross-sectional side view of the optical assembly of FIG. 8 having a motor position distance of 0 millimeters.

FIG. 9B is an image of the illumination field of the optical configuration of FIG. 9A.

FIG. 9C is the illumination full field angle in polar coordinates for the optical configuration of FIG. 9A.

FIG. 10A is a cross-sectional side view of the optical assembly of FIG. 8 having a motor position distance of 0.25 millimeters.

FIG. 10B is an image of the illumination field of the optical configuration of FIG. 10A.

FIG. 10C is the illumination full field angle in polar coordinates for the optical configuration of FIG. 10A.

FIG. 11A is a cross-sectional side view of the optical assembly of FIG. 8 having a motor position distance of 0.5 millimeters.

FIG. 11B is an image of the illumination field of the optical configuration of FIG. 11A.

FIG. 11C is the illumination full field angle in polar coordinates for the optical configuration of FIG. 11A.

Figure 1:
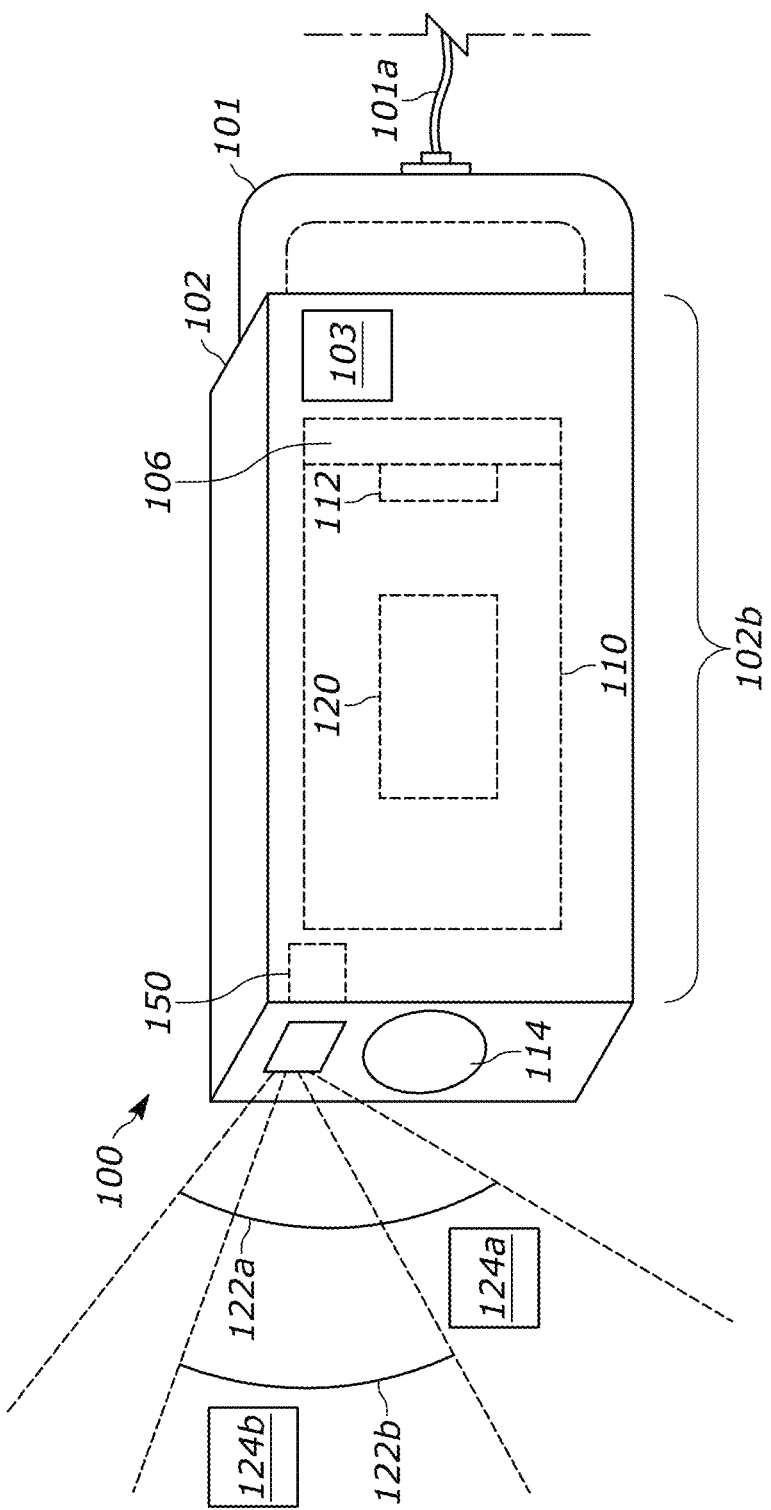
FIG. 1 is a schematic side elevation view of an imaging device having an adaptive illumination system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Portable high-performance optical imaging systems for machine vision employ small imaging sensors to maintain small form factors. For example a typical machine vision imaging sensor has an imaging sensor rectangular area of around 3 by 3 millimeters with sensor pixels areas of approximately 3 microns. Some high-performance compact machine vision systems require wide angle fields of view (FOVs) (e.g., greater than 40 degrees) in addition to small form factor imaging sensors. Barcode readers often require wide imaging FOVs for efficiently reading barcodes at short distances, while requiring narrower FOVs to efficiently read barcodes at further distances. The change in the FOV of a barcode reader changes the pixels per module (PPM) that is able to be imaged by the barcode reader, and therefore, changes the efficiency of barcode imaging and reading. Typically, a barcode reader requires a minimum PPM to properly read a barcode.

To implement a compact barcode reader or imaging system, an internal illumination system may be required. It is often difficult to make an illumination system that meets the wide FOV illumination requirements of high performance barcode readers, while at the same time, producing enough light at farther distances to illuminate a target and properly image and read the target. As described herein, it may be beneficial to have the ability to increase an illumination FOV of an illumination system to read barcodes at short distances, while being able to decrease the FOV of the illumination system to provide more illumination to a target at a farther distance to allow for enough PPMs to read barcodes at different distances.

The current disclosure describes a compact optical assembly with an adaptive illumination system. The optical assembly can change the FOV of the adaptive illumination system according to the distance of an object of interest. For example, the optical assembly may include an imaging system having a focus distance to an object of interest. The illumination system may be configured to have a wide FOV when the imaging system is focused at a shorter focal distance, and the illumination system may be configured to have a narrow FOV when the imaging system is focused at a further distance, therefore adjusting the amount of illumination received by the object of interest at different distances from the optical assembly. The described adaptive illumination system may be employed in an optical assembly having digital zoom, optical zoom, auto-focus, variable focus elements, or any other optical assembly configured to change the imaging focus or to perform optical detection at different target distances.

The current disclosure describes an adaptive illumination system that employs a collimating lens, and a plurality of multiple lens arrays (MLAs) that improves upon current technologies by: (i) enabling wide FOV illuminations for objects at a range of distances, (ii) providing narrow FOV illuminations for objects at a range of distances, (iii) provides efficient reading of targets are a large range of focal distances of the imaging system, and (iii) reduces the size and cost of autofocusing optical imaging systems, and specifically the illumination system, for machine vision.

In an exemplary implementation, the present application provides an optical assembly with an adaptive illumination system providing adaptive illumination of an object of interest. In various embodiments of the present disclosure, the optical assembly includes an illumination source, a collimating lens, a fixed MLA, and a movable MLA disposed along an optical illumination axis. The illumination source is configured to provide light along the optical axis to provide illumination to a target with the illumination of the target having an illumination full field angle. The collimation lens is disposed along the optical axis configured to receive the light from the illumination source and further configured to collimate the light along the optical axis. The fixed multiple lens array is disposed along the optical axis configured to receive the light from the collimating lens, and the movable multiple lens array is disposed along the optical axis configured to receive the light from the fixed lens array. The position of the movable multiple lens array is adjustable and which may be adjusted to change the illumination full field angle of the illumination.

Figure 2:
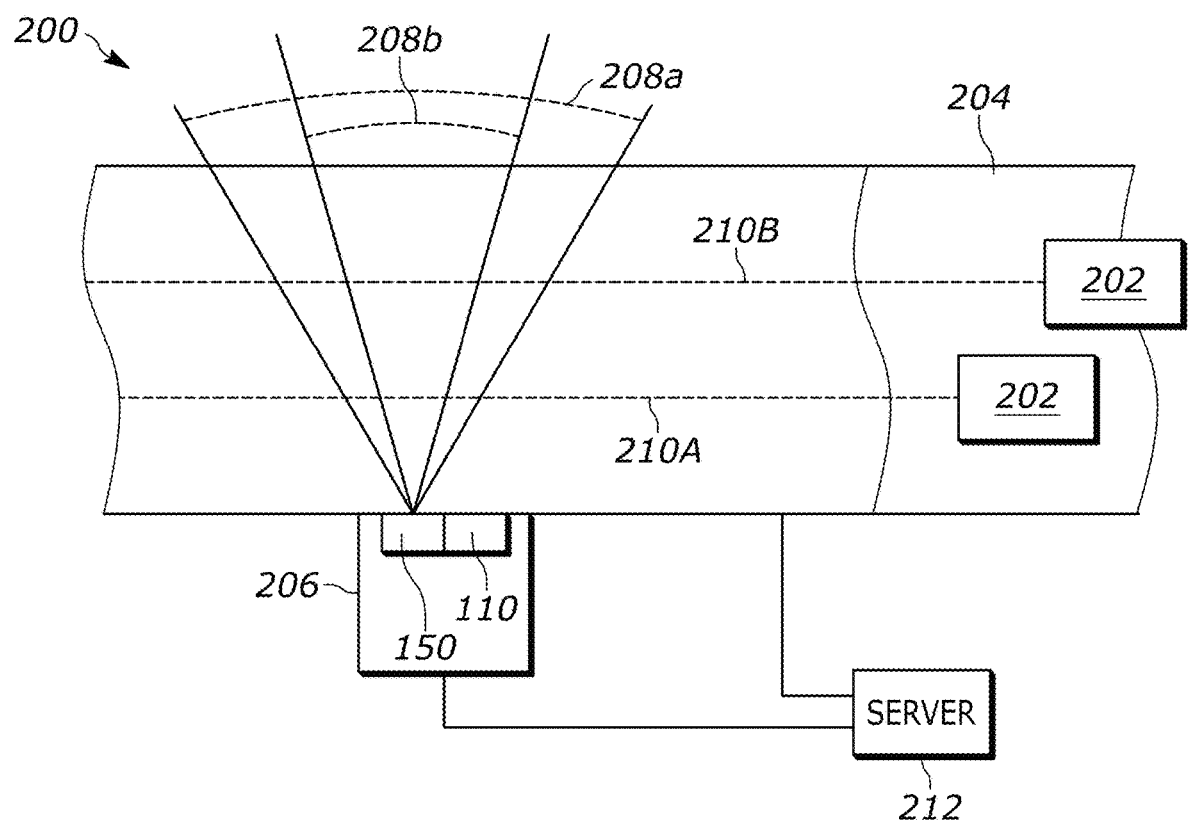
FIG. 2 is a schematic top-view of an imaging scanning station having an autofocus system and an adaptive illumination system in accordance with some embodiments.
Figure 3:
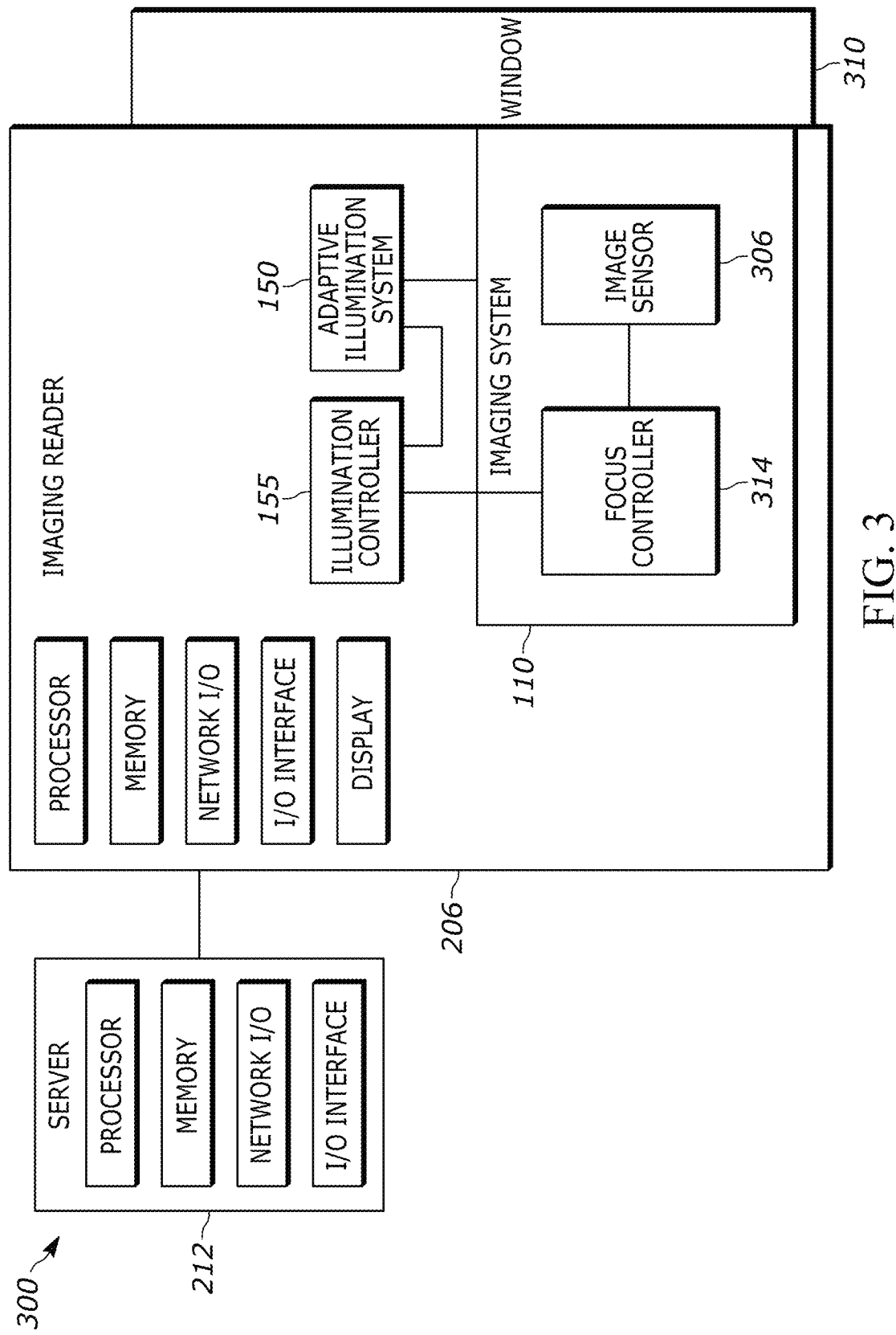
FIG. 3 illustrates a block connection diagram of system including an imaging reader.

A first embodiment of an imaging device, that may include an adaptive illumination system as described herein, is shown schematically in FIGS. 1-3. The imaging device 100 includes a housing 102, an illumination system 150, and an imaging system 110 at least partially disposed within the housing 102 that includes an imaging camera assembly. Specifically, the imaging system 110 includes an image sensor 112 and a lens assembly 120. The device 100 may be adapted to be inserted into a docking station 101 which, in some examples, may include an AC power source 101a to provide power for the device 100. The device 100 may further include an onboard power supply 103, such as a battery and a printed circuit board 106 that may accommodate a memory and a controller that controls operation of the imaging system 110. In embodiments, the device 100 may include a trigger (not shown in the illustration) is used to activate the imaging system 110 to capture an image. The device 100 may include any number of additional components such as decoding systems, processors, and/or circuitry coupled to the circuit board 106 to assist in operation of the device 100.

The housing 102 includes a forward or reading head portion 102b which supports the imaging system 110 within an interior region of the housing 102. The imaging system 110 may, but does not have to be, modular as it may be removed or inserted as a unit into the devices, allowing the ready substitution of illumination systems 150 and/or imaging systems 110 having different illumination and/or imaging characteristics (e.g., illumination systems having different illumination sources, lenses, illumination filters, illumination FOVs and ranges of FOVs, camera assemblies having different focal distances, working ranges, and imaging FOVs) for use in different devices and systems. In some examples, the field of view may be static.

The image sensor 112 may have a plurality of photosensitive elements forming a substantially flat surface and may be fixedly mounted relative to the housing 102 using any number of components and/or approaches. The image sensor 112 further has a defined central imaging axis, A, that is normal to the substantially flat surface. In some embodiments, the imaging axis A is coaxial with a central axis of the lens assembly 120. The lens assembly 120 may also be fixedly mounted relative to the housing 102 using any number of components and/or approaches. In the illustrated embodiment, the lens assembly 120 is positioned between a front aperture 114 and the image sensor 112. The front aperture 114 blocks light from objects outside of the field of view which reduces imaging problems due to stray light from objects other than the target object. Additionally, the front aperture 114 in conjunction with a one or more lenses allows for the image to form correctly on the imaging sensor 112.

The housing 102 includes an illumination system 150 configured to illuminate a target object of interest for imaging of the target. The target may be a 1D barcode, 2D barcode, QR code, UPC code, or another indicia indicative of the object of interest such as alphanumeric characters or other indicia. The illumination system 150 may be an adaptive illumination system as described further herein. The illumination system 150 may adaptively provide a wide-angle illumination FOV 122a to enable wide-angle imagine of a close target 124a, or provide a narrow-angle illumination FOV 122b to for imagine of a far-away target 124b.

FIG. 2 illustrates an embodiment of a scanning station 200 that includes an adaptive illumination system. Goods 102 are moved across or along a scanning surface 204, are illuminated by an adaptive illumination source 150, and imaged by an imaging system 110, of an imaging reader 206 to identify the goods 202. In some embodiments, the scanning station 200 is a point-of-sale (POS) station, which may have a computer system and an interface, not shown, for optically scanning goods and identifying the goods and characteristics of the goods for affecting a transaction. In some embodiments, the scanning station is part of an inventory delivery system, where goods are conveyed by the scanning surface or across the scanning surface to monitor and control delivery of the goods, for example, shipping goods from a facility or receiving shipped goods to a facility.

The scanning surface 204 may be a stationary surface, such that the goods 202 are manually moved relative to the surface 204. In embodiments, the scanning surface 204 may move the goods 202 or be moved by another automated means. In other embodiments, the scanning surface 204 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 202 may be moved continuously relative to the imaging reader 206, such that the goods 202 are constantly moving through a current working (or scanning) range of the station 200. For example, the station may have a wide-angle working range 208a and a narrow FOV 208b depending on the distance of the good 202, an illumination FOV of the adaptive illumination system 150, and/or an FOV of the imaging system 110. In some examples, the goods 202 move in a discretized manner, where, at least part of the time the goods 202 are maintained fixed on the surface 204 relative to the imaging reader 206 for a period of time, sufficient to allow one or more images to be captured of the goods 202.

The goods 202 may move along different substantially linear paths 210A, 210B, etc. each path traversing the working ranges 208a and 208b but at a different distance from the imaging reader 206. The adaptive illumination system 150 may change the illumination FOV depending on the distance of the goods 202 from the imaging reader 206. For example, the imaging system 110 may determine an imaging focal distance of the good 202 and the adaptive illumination system 150 may change the illumination FOV depending on the imaging focal distance. In embodiments, a controller may control the adaptive illumination system 150 to control the FOV of the adaptive illumination system 150. The paths 210A, 210B are for illustration purposes, as the goods 202 may traverse across the surface 204 at any distance from the imaging reader 206, and, accordingly, the adaptive illumination system may provide a range of illumination FOVs for imaging the goods depending on the distance of the goods 202 from the imaging reader 206.

FIG. 3 illustrates a block connection diagram of system 300 including an imaging reader 206. While in reference herein to the imaging reader 206 of FIG. 2, the system 300 may be implemented with the imaging device 100 of FIG. 1. In FIG. 3 the imaging reader 206 may have one or more processors and one or more memories storing computer executable instructions to perform operations associated with the systems and methods as described herein. The imaging reader 206 includes a network input/output (I/O) interface for connecting the reader to the server 212, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 212 (and/or other connected devices) may be located in the same scanning station 200. In other embodiments, server 212 (and/or other connected devices) may be located at a remote location, such as on a cloud-platform or other remote location. In still other embodiments, server 212 (and/or other connected devices) may be formed of a combination of local and cloud-based computers.

Server 212 is configured to execute computer instructions to perform operations associated with the systems and methods as described herein. The server 212 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

In the illustrated example, the imaging reader 206 includes an adaptive illumination system 150, which may include a visible light source (e.g., a light emitting diode (LED) emitting at 640 nm) or an infrared light source (e.g., emitting at or about 700 nm, 850 nm, or 940 nm, for example), with the adaptive illumination system 150 capable of generating an illumination beam that illuminates the a working range 208a or 208b for imaging over an entire working distance of that working range 208a or 208b. That is, the adaptive illumination system 150 is configured to illuminate over at least each of the entire working ranges 208a and 208b. In embodiments, the adaptive illumination system 150 may be capable of illuminating a plurality of working ranges with each having a corresponding FOV and working distance from the imaging reader 206. The illumination intensity of the adaptable illumination system 150 and the sensitivity of an imaging reader can determine the further and closest distances (defining the distance of the working range, also termed the scanning range), and the working ranges in respect to illumination FOV, over which a good can be scanned, and a barcode on the good can be decoded.

The adaptive illumination system 150 may be controlled by a processor and may be a continuous light source, an intermittent light source, or a signal-controlled light source, such as a light source trigged by an object detection system coupled (or formed as part of though not shown) to the imaging reader 206. The adaptable illumination system may include a light source such as a laser diode, an LED, a black body radiation source, an infrared light source, a near-infrared light source, an ultraviolet light source, a visible light source, an omnidirectional illumination source, or another illumination source. Additionally, the adaptive illumination system 150 may include optics for dispersing, focusing, and/or filtering optical radiation for illumination of the target object. In embodiments, the adaptive illumination system 150 may be housed inside of the housing 102 of FIG. 1 or may attach to the external surfaces of the housing 102. In embodiments, the adaptive imaging system 150 may be housed in the imaging reader 206 of FIG. 3 or may attach to the external surface of the imaging reader 206. In embodiments, the adaptive imaging system 150 may be a separate device or component from the housing 102 and/or imaging reader 106, with the adaptive illumination system 150 configured to illuminate the target object for capturing an image by the imagine device 100 or the imaging reader 106.

The imaging reader 106 further includes the imaging system 110 having an imaging sensor 306 positioned to capture images of an illuminated target, such as the goods 102 or another object of interest (OOI), within a working range 208a or 208b of the imagine reader 206. In some embodiments, the imaging sensor 306 is formed of one or more CMOS imaging arrays. In some embodiments the imaging sensor may be a charge coupled device or another solid-state device. The imaging sensor 306 may be a one-megapixel sensor with pixels of approximately three microns in size. In embodiments, the imaging sensor includes 3-millimeter pixels, having a total of about 2 megapixels, resulting in an overall imaging sensor width and length of 3 microns in each dimension. In embodiments, the imaging sensor 306 may be a variable focus imaging sensor such as an auto-focus camera capable of changing imaging focal planes for imaging objects at different distances from the imaging reader 206.

The imaging reader may include one or more windows 310 for allowing illumination from the adaptive illumination system 150 to exit the imaging reader 206, and for light from the OOI to reach the image sensor 306. In embodiments, the adaptive illumination system 150 may be external to the imaging reader 206 and the external illumination system may include a window for transmitting the illumination, or the external illumination system may emit the illumination into free space without the use of a window. In embodiments, the adaptive illumination system 150 may provide illumination to an OOI through optical filters, a window, spatial filters, an aperture, or another structure to provide the illumination of the OOI.

A focus controller 314 is coupled to the controls the imaging sensor 306 and any variable focus optics (e.g., a deformable lens, a liquid lens, a translatable lens, a translatable grating, or other variable focus optical elements) to define one or more discrete imaging planes for the imaging sensor 306. In embodiments, the imaging system 110 may include a focusing lens drive, a shift lens drive, a zoom lens drive, an aperture drive, angular velocity drive, voice coil motor drive, and/or other drive units for controlling the focal distance of the imaging system 110, which may further include multiple lens, lens stages, etc. In embodiments, once a focal plane for imaging an OOI is established by the image sensor 306, the focus controller 314, and/or a processor in communication with the image sensor 306 and focus controller 314, information indicative of the focal distance may be provided to the illumination controller 55. The illumination controller 155 may process the information indicative of the focal distance to determine a desired FOV and illumination distance (i.e., illumination intensity output) of the adaptive illumination system 150. The illumination controller 155 may then control the adaptive illumination system 150 to cause the adaptive illumination system 150 to provide illumination according to the determined FOV an illumination distance. In some embodiments, the adaptive illumination system 150 includes a movable multiple lens array coupled to a voice coil actuator motor that is controllably adjusted by the illumination controller 155 to change the illumination FOV.

In embodiments, the memory may store information regarding the focal distances of OOIs such as the good 202 and the illumination controller 155 may retrieve the information from the memory to determine a desired illumination FOV and illumination intensity, or a plurality of potential illumination FOVs and illumination intensities. The illumination controller 155 may then determine, based on information from the focus controller 314 one of the plurality of illumination FOVS and illumination intensities, and control the adaptive illumination system 150 to provide illumination at the determined illumination FOV and illumination intensity. Further, the illumination controller may control the adaptive illumination system 150 to provide illumination according to various FOVs and illumination intensities to determine desired illumination parameters for a given OOI, or to provide the imaging system 110 with various illuminations for capturing a plurality of images on an OOI. A preferred illumination may then be determined by the imaging system 110, or a processor in communications with the imaging system 110, and the illumination controller 155 may be provided with the determined desired illumination.

Figure 4A:
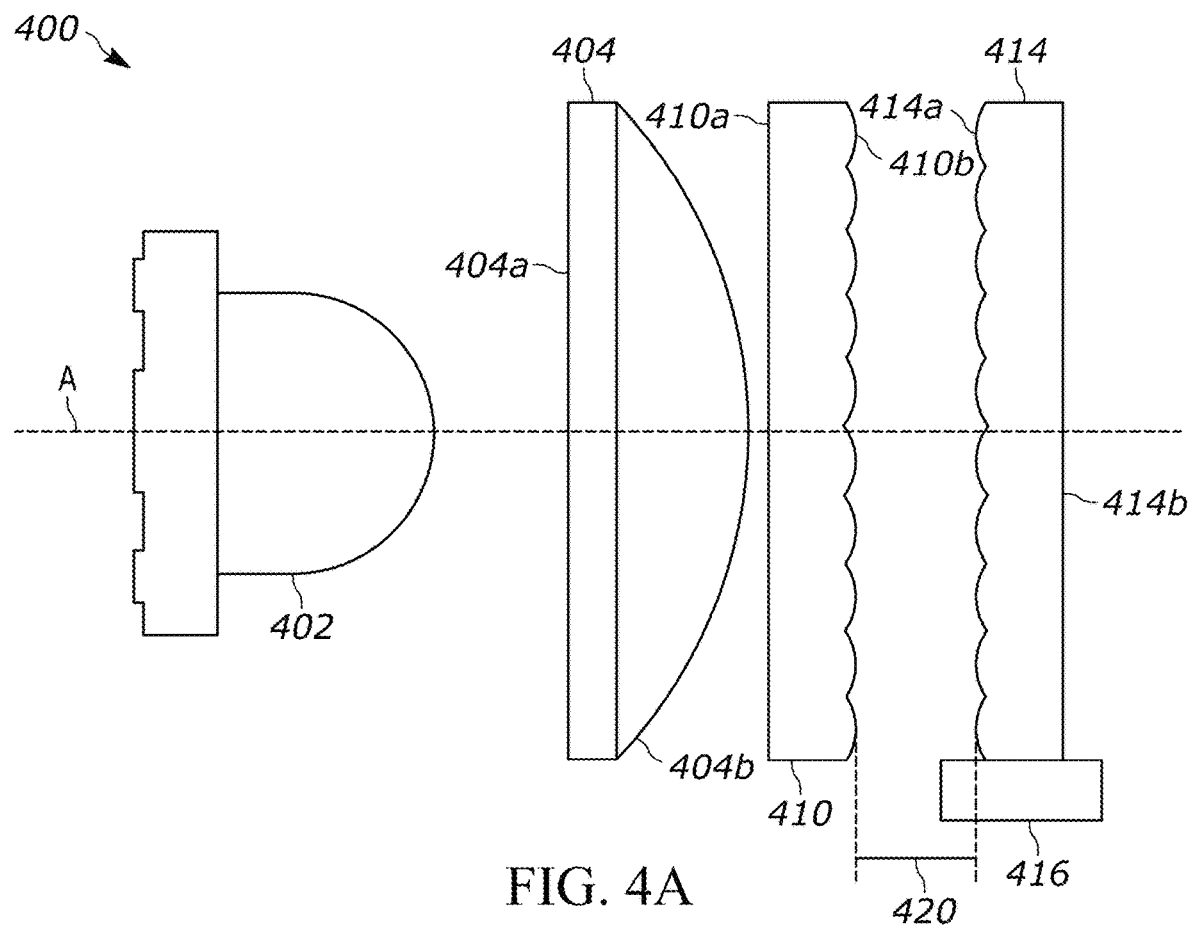
FIG. 4A is a cross-sectional side view of an optical assembly of an adaptive illumination system
Figure 4B:
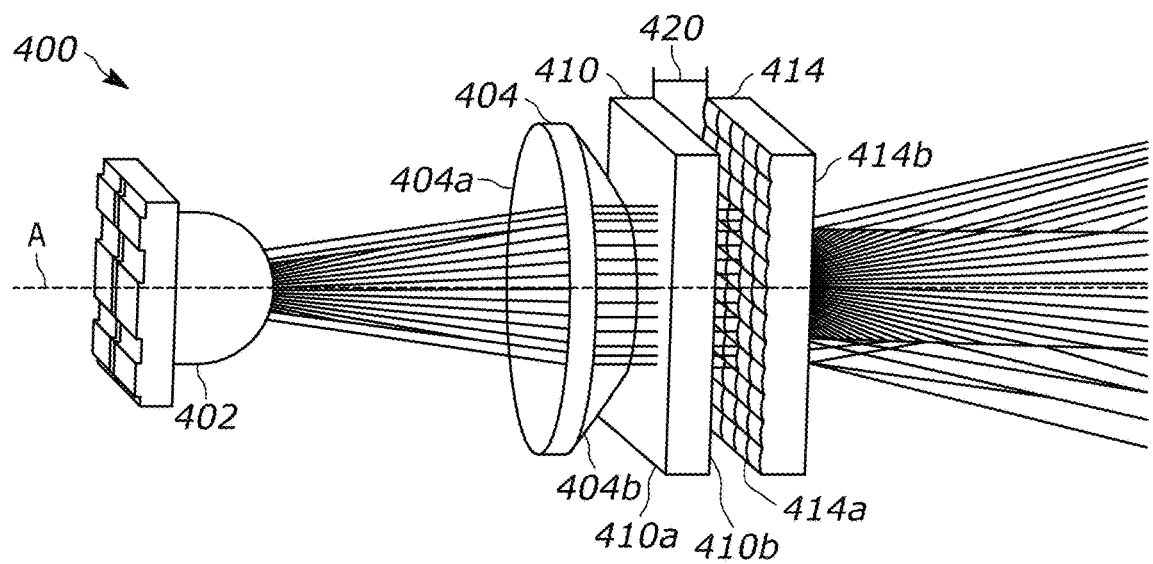
FIG. 4B is a perspective view with ray tracing of the optical assembly of FIG. 4A.

FIGS. 4A and 4B illustrate an optical assembly 400 of the adaptive illumination system 150 of FIGS. 1 and 2 in accordance with some embodiments. FIG. 4A is a cross-sectional side view of the optical assembly 400, while FIG. 4B is a perspective view of the optical assembly 400 including ray tracing. Referring now to FIGS. 4A and 4B, the optical assembly 400 includes an illumination source 402, a collimating lens 404, a fixed multiple lens array (MLA) 410, and a movable MLA 414. The optical source 402 provides illumination along an optical axes A to provide illumination to a target. In embodiments, the target may be an object of interest itself, or the target may include indicia indicative of an object of interest such as a barcode, alphanumeric identifier, or other indicia. The illumination source 402 provides illumination to the collimating lens 404. In embodiments, the illumination source 402 may include a laser diode, an LED, a black body radiation source, an infrared light source, a near-infrared light source, an ultraviolet light source, a visible light source, an omnidirectional illumination source, or another light source. The collimating lens 404 is disposed along the optical axis A configured to receive the illumination in the form of light from the illumination source 402. The collimating lens 404 has a first surface 404a configured to receive the light from the illumination source 402, and a second surface 404b configured to provide the light to the movable MLA 414. The first surface 404a of the collimating lens 404 is a planar surface and the second surface 404b of the collimating lens is a convex surface. In embodiments, the collimating lens may be an acrylic, polycarbonate, Zeonex, a glass material such as BK1, H-ZLAF68, H-LAK53B or another glass, plastic, or optical material capable of transmitting light through it. In embodiments, both the first and second surfaces 404a and 404b are convex surfaces and each of the first and second surfaces 404a and 404b may be spherical or aspherical. In embodiments, the collimating lens 404 has an overall positive optical power with an index of refraction from 1.4 to 2.0 and Abbe value from 20 to 70. The collimating lens 404 is configured to collimate the light, or to approximately collimate the light, to provide the collimated light to the fixed MLA 410. In embodiments, the collimating lens 404 collimates the light to have a divergence of less than 1°, less than 2°, less than 5°, less than 8°, less than 10°, less than 15°, or less than 20°.

The fixed MLA 410 is disposed along the optical axis A configured to receive the light from the collimating lens 404. The fixed MLA 410 has a first surface 410a disposed along the optical axis A configured to receive the light from the collimating lens 404 and a second surface 410b disposed along the optical axis A configured to provide the light to the movable MLA 414. The first surface 410a of the fixed MLA 410 is a planar surface and the second surface 410b of the fixed MLA 410b is a surface having a plurality of lens cells that make up the multiple lens array (MLA) of the fixed MLA 410. In embodiments, the plurality of lens cells is a plurality of convex lens cells. Each lens cell of the plurality of convex lens cells may have a size of approximately 0.6±0.05 by 0.7±0.05 millimeters, 0.5±0.05 by 0.6±0.05 millimeters, 0.4±0.05 millimeters by 0.5±0.05 millimeters, 0.3±0.05 millimeters by 0.4±0.05 millimeters, 0.2±0.05 by 0.3±0.05 millimeters, 0.1±0.05 by 0.2±0.05 millimeters. In embodiments, lens cells of the plurality of lens cells may have equal dimensions, for example, each lens cell may have a size of 0.1±0.05 by 0.1±0.05 millimeters, 0.2±0.05 by 0.2±0.05 millimeters, 0.3±0.05 by 0.3±0.05 millimeters, or dimensions greater than 0.3 millimeters. In embodiments, the width and height of each of the lens cells of the plurality of lens cells may independently be between 0.2 millimeters to 1.2 millimeters. In embodiments, the fixed MLA 410 may be a plastic material such as Zeonex, Acrylic, Polycarbonate, K26R, E48R or another plastic material. In embodiments, the fixed MLA 410 may be a glass material or other optical material able to transmit light. In embodiments, the fixed MLA 410 has an index of refraction of 1.45 to 1.8 and an Abbe value of 25 to 65. In embodiments, each of the lenses of the plurality of lens cells have an effective focal distance of approximately 0.2±0.05 millimeters to 1.0±0.05 millimeters. In embodiments, the lens surface of each of the lenses of the plurality of lenses may be spherical, aspherical, toroidal, or free form. In a preferred embodiment, the fixed MLA 410 has a positive optical power. In embodiments, the lens surface of each of the lenses of the plurality of lenses may be a toroidal shape with X and Y radii of 0.2 to 2.0 millimeters. As described herein, X and Y axis may be considered a horizontal and vertical axis, or any two orthogonal dimensional axes in a coordinate space. In embodiments, the thickness of the fixed MLA 410 is between 0.2 millimeters and 1.2 millimeter. In embodiments, the first and second surfaces 410a and 410b of the fixed MLA 410 may be a same material, or the first surface 410a of the fixed MLA 410 may be a first material and the second surface 410b of the fixed MLA 410 may be a second material that is different than the first material. In embodiments, the first surface 410a of the fixed MLA 410 may include a plurality of lens cell and the second surface 410b of the fixed MLA 410 may be a planar surface. In embodiments, both the first surface 410a and the second surface 410b of the fixed MLA 410 may be a planar surface, or both may be a surface having a plurality of lens cells. In embodiments, either of the first and second surfaces 410a and 410b of the fixed MLA 410 may each independently be a concave or convex surface.

The movable MLA 414 is disposed along the optical axis A configured to receive the light from the fixed MLA 410. The movable MLA 414 has a first surface 414a disposed along the optical axis configured to receive the light from the fixed MLA 410 and a second surface 414b disposed along the optical axis A configured to provide the light to the target. The first surface 414a of the movable MLA 414 is a surface having a plurality of lens cells that make up the multiple lens array of the movable MLA 410, and the second surface 414b of the movable MLA 414b is a planar surface. In embodiments, the plurality of lens cells is a plurality of convex lens cells. Each lens cell of the plurality of convex lens cells may have a size of approximately 0.6±0.05 by 0.7±0.05 millimeters, 0.5±0.05 by 0.6±0.05 millimeters, 0.4±0.05 millimeters by 0.5±0.05 millimeters, 0.3±0.05 millimeters by 0.4±0.05 millimeters, 0.2±0.05 by 0.3±0.05 millimeters, 0.1±0.05 by 0.2±0.05 millimeters. In embodiments, lens cells of the plurality of lens cells may have equal dimensions, for example, each lens cell may have a size of 0.1±0.05 by 0.1±0.05 millimeters, 0.2±0.05 by 0.2±0.05 millimeters, 0.3±0.05 by 0.3±0.05 millimeters, or dimensions greater than 0.3 millimeters. In embodiments, the width and height of each of the lens cells of the plurality of lens cells may independently be between 0.2 millimeters to 1.2 millimeters. In embodiments, the movable MLA 414 may be a plastic material such as Zeonex, Acrylic, Polycarbonate, K26R, E48R or another plastic material. In embodiments, the movable MLA 414 may be a glass material or other optical material able to transmit light. In embodiments, the movable MLA 414 has an index of refraction of 1.45 to 1.8 and an Abbe value of 25 to 65. In embodiments, each of the lenses of the plurality of lens cells have an effective focal distance of approximately 0.2±0.05 millimeters to 1.0±0.05 millimeters. In embodiments, the lens surface of each of the lenses of the plurality of lenses may be spherical, aspherical, toroidal, or free form. In a preferred embodiment, the movable MLA 414 has a positive optical power. In embodiments, the lens surface of each of the lenses of the plurality of lenses may be a toroidal shape with X and Y radii of 0.2 to 2.0 millimeters. In embodiments, the thickness of the fixed MLA 410 is between 0.2 millimeters and 1.2 millimeter. In embodiments, the first and second surfaces 414a and 414b of the movable MLA 414 may be a same material, or the first surface 414a of the movable MLA 414 may be a first material and the second surface 414b of the movable MLA 414 may be a second material that is different from the first material. In embodiments, the first surface 414a of the movable MLA 414 may be a planar surface and the second surface 414b of the movable MLA 414 may include a plurality of lens cells. In embodiments, both the first surface 414a and the second surface 414b of the movable MLA 414 may be a planar surface, or both may be a surface having a plurality of lens cells. In embodiments, either of the first and second surfaces 414a and 414b of the movable MLA 414 may each independently be a concave or convex surface. In preferred embodiments, the overall length of the optical assembly 400 along the optical axis A from the illumination source 402 to the movable MLA 414 is less than 11 mm. In embodiments, the length of the optical assembly 400 may be 25 millimeters or less.

In embodiments, a motor 416 is coupled to the movable MLA 414 configured to move the movable MLA 414 closer to change the position of the movable MLA 414 to adjust the illumination FOV of the optical assembly 400 of the adaptable illumination system 150. In embodiments, the motor 416 may be an actuator, a voice coil motor, a piezoelectric device, a microelectromechanical systems (MEMS) motor, or another compact motor. In embodiments, the motor 416 may be configured to move the movable MLA 414 a travel distance of between 0.2 millimeters and 3 millimeters. At a given separation distance 420 of the movable MLA 414 from the fixed MLA 410 the adaptable illumination system 150 exhibits a first illumination FOV, and at a different distance 420, the illumination system exhibits a different illumination FOV. For example, as the distance 420 between the movable MLA 414 and the fixed MLA 410 increased the illumination FOV narrows.

FIGS. 5A, 6A, and 7A are cross-sectional side views of the optical assembly of FIG. 4A having a distance 420 of 0 millimeters, 0.5 millimeters, and 1 millimeter respectively. The distance 420 is measured as a distance of motion of the motor 416, which may be described herein as the motor position distance. A distance 420 of 0 millimeters as described here corresponds to a separation of 0.2 millimeters between the second surface 410b of the fixed MLA 410 and the first surface 414a of the movable MLA 414. Therefore, distances 420 of 0.5 millimeters and 1 millimeters correspond to separations of 0.7 millimeters and 1.2 millimeters, respectively, between the second surface 410b of the fixed MLA 410 and the first surface 414a of the movable MLA 414. In embodiments, the motor 416 may be configured to allow the movable MLA 414 to physically come into contact with the fixed MLA 410 and therefore the separation of the two MLA's would be 0 millimeters. In embodiments, the motor 416 may be configured to move the movable MLA 414 to any range of distances 420 to provide a desired illumination FOV for illuminating the target.

FIGS. 56, 6B, and 7B are images of the illumination field of the optical configurations of the optical assemblies 400 of FIGS. 5A, 6A, and 7A respectively, at a distance of 200 millimeters from the collimating lens along the optical axis, A. FIGS. 5C, 6C, and 7C are the illumination full field angles in polar coordinates for the optical configurations of the optical assemblies 400 shown in FIGS. 5A, 6A, and 7 A respectively. The light intensity shown in FIGS. 5C, 6C, and 7C is normalized to one. The polar illumination plots illustrate the far field light radiant intensity distribution, which represents how much light propagates within a particular angle segment. The Y-axis has a maximum of 1.0 which represents the normalized light radiant intensity within an angle segment. The FOVs represented in FIGS. 5C, 6C, and 7C were defined as the 0.5 (i.e., 50%) light intensity drop off of the illumination.

As shown by the FIGS. 5A-5C, 6A-6C, and 7A-7C, the illumination FOV decreases with increased distance 420 between the fixed MLA 410 and the movable MLA 414. The illumination FOV is tuned from approximately 42 degrees in FIG. 5C, to approximately 16 degrees in FIG. 7C. Therefore, the optical configuration of FIG. 7A allows for illumination of a target at further distances than either of the optical configurations of FIG. 5A or 6A, and the configuration of FIG. 5A may provide for more efficient imaging or reading of a target that is closer to the adaptive illumination system 150. In embodiments, the FOV may be tuned from 10 to 20 degrees, 20 to 40 degrees, 30 to 60 degrees, to less than 50 degrees, to greater than 60 degrees, or to any range of values between 4 and 80 degrees.

Figure 8:
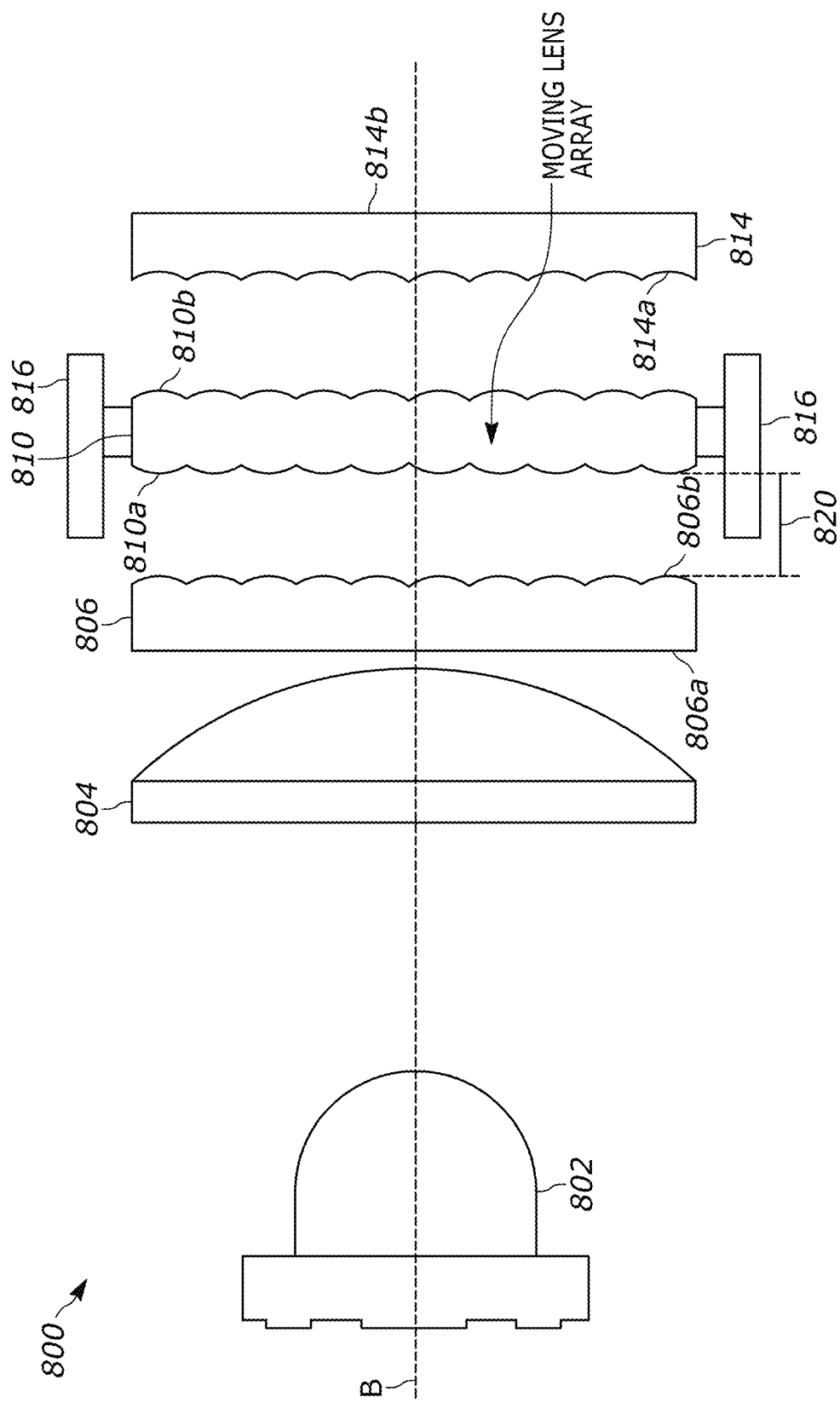
FIG. 8 is a cross-sectional view of an optical assembly of the adaptive illumination system of FIGS. 1 and 2 in accordance with some embodiments.

FIG. 8 illustrates an optical assembly 800 of the adaptive illumination system 150 of FIGS. 1 and 2 in accordance with some embodiments. FIG. 8 is a cross-sectional side view of the optical assembly 800. Referring now to FIG. 8 optical assembly 800 includes an illumination source 802, a collimating lens 804, a first fixed MLA 806, a movable MLA 810, and a second fixed MLA 814. The illumination source 802 provides illumination along an optical axes B to provide illumination to a target. In embodiments, the target may be an object of interest itself, or the target may include indicia indicative of an object of interest such as a barcode, alphanumeric identifier, or other indicia. The illumination source 802 provides illumination to the collimating lens 804. In embodiments, the illumination source may include a laser diode, an LED, a black body radiation source, an infrared light source, a near-infrared light source, an ultraviolet light source, a visible light source, an omnidirectional illumination source, or another light source. The collimating lens 804 is disposed along the optical axis B configured to receive the illumination in the form of light from the illumination source 802. The collimating lens 804 has a first surface 804a configured to receive the light from the illumination source 802, and a second surface 804b configured to provide the light to the first fixed MLA 806. The first surface 804a of the collimating lens 804 is a planar surface and the second surface 804b of the collimating lens 804 is a convex surface. In embodiments, the collimating lens 804 may be acrylic, polycarbonate, Zeonex, a glass material such as BK1, H-ZLAF68, H-LAK536 or another glass, plastic, or optical material capable of transmitting light through it. In embodiments, both the first and second surfaces 804a and 804b are convex surfaces and each of the first and second surfaces 804a and 804b may be spherical or aspherical. In embodiments, the collimating lens 804 has an overall positive optical power with an index of refraction from 1.4 to 2.0 and Abbe value from 20 to 70. The collimating lens 804 is configured to collimate the light, or to approximately collimate the light, to provide the collimated light to the first fixed MLA 806. In embodiments, the collimating lens 804 collimates the light to have a divergence of less than 1°, less than 2°, less than 5°, less than 8°, less than 10°, or less than 15°.

The first fixed MLA 806 is disposed along the optical axis B configured to receive the light from the collimating lens 802. The first fixed MLA 806 has a first surface 806a disposed along the optical axis B configured to receive the light from the collimating lens 804 and a second surface 810b disposed along the optical axis B configured to provide the light to the movable MLA 810. The first surface 806a of the first fixed MLA 806 is a planar surface and the second surface 806b of the first fixed MLA 806 is a surface having a plurality of lens cells that make up the multiple lens array (MLA) of the first fixed MLA 806. In embodiments, the plurality of lens cells is a plurality of convex lens cells. Each lens cell of the plurality of convex lens cells may have a size of approximately 0.6±0.05 by 0.7±0.05 millimeters, 0.5±0.05 by 0.6±0.05 millimeters, 0.4±0.05 millimeters by 0.5±0.05 millimeters, 0.3±0.05 millimeters by 0.4±0.05 millimeters, 0.2±0.05 by 0.3±0.05 millimeters, 0.1±0.05 by 0.2±0.05 millimeters. In embodiments, lens cells of the plurality of lens cells may have equal dimensions, for example, each lens cell may have a size of 0.1±0.05 by 0.1±0.05 millimeters, 0.2±0.05 by 0.2±0.05 millimeters, 0.3±0.05 by 0.3±0.05 millimeters, or dimensions greater than 0.3 millimeters. In embodiments, the width and height of each of the lens cells of the plurality of lens cells may independently be between 0.2 millimeters to 1.2 millimeters. In embodiments, the first fixed MLA 806 may be a plastic material such as Zeonex, Acrylic, Polycarbonate, K26R, E48R or another plastic material. In embodiments, the first fixed MLA 806 may be a glass material or other optical material able to transmit light. In embodiments, the first fixed MLA 806 has an index of refraction from 1.45 to 1.8 and an Abbe value of 25 to 65. In embodiments, each of the lenses of the plurality of lens cells have an effective focal distance of approximately 0.2±0.05 millimeters to 1.0±0.05 millimeters. In embodiments, the lens surface of each of the lenses of the plurality of lenses may be spherical, aspherical, toroidal, or free form. In a preferred embodiment, the first fixed MLA 806 has a positive optical power. In embodiments, the lens surface of each of the lenses of the plurality of lenses may be a toroidal shape with X and Y radii of 0.2 to 2.0 millimeters. In embodiments, the thickness of the first fixed MLA 806 is between 0.2 millimeters and 1.2 millimeter.

In embodiments, the first and second surfaces 806a and 806b of the first fixed MLA 806 may be a same material, or the first surface 806a of the first fixed MLA 806 may be a first material and the second surface 806b of the first fixed MLA 806 may be a second material that is different than the first material. In embodiments, the first surface 80a of the first fixed MLA 806 may include a plurality of lens cells and the second surface 806b of the first fixed MLA 806 may be a planar surface. In embodiments, both the first surface 806a and the second surface 806b of the first fixed MLA 806 may be a planar surface, or both the first surface 806a and the second surface 806b may be a surface having a plurality of lens cells.

The movable MLA 810 is disposed along the optical axis B configured to receive the light from the first fixed MLA 806. The movable MLA 810 has a first surface 810a disposed along the optical axis B configured to receive the light from the first fixed MLA 806 and a second surface 810b disposed along the optical axis B configured to provide the light to the second fixed MLA 814. The first surface 810a of the movable MLA 810 is a surface having a plurality of lens cells, and the second surface 810b of the movable MLA 810 is a surface having a plurality of lens cells. In embodiments, plurality of lens cells of the first surface 810a is a plurality of convex lens cells, and the plurality of lens cells of the second surface 810b is a plurality of convex lens cells. Each lens cell of the plurality of lens cells of the first and second surfaces 810a and 810b may have a size of approximately 0.6±0.05 by 0.7±0.05 millimeters, 0.5±0.05 by 0.6±0.05 millimeters, 0.4±0.05 millimeters by 0.5±0.05 millimeters, 0.3±0.05 millimeters by 0.4±0.05 millimeters, 0.2±0.05 by 0.3±0.05 millimeters, 0.1±0.05 by 0.2±0.05 millimeters. In embodiments, lens cells of the pluralities of lens cells of the first and second surfaces 810a and 810b may have equal dimensions, for example, each lens cell may have a size of 0.1±0.05 by 0.1±0.05 millimeters, 0.2±0.05 by 0.2±0.05 millimeters, 0.3±0.05 by 0.3±0.05 millimeters, or dimensions greater than 0.3 millimeters. In embodiments, the lens cells of the plurality of lens cells of the first surface 810a may have same dimensions as the lens cells of the plurality of lens cells of the second surface 810b, or the plurality of lens cells of the first surface 810a may have different dimensions than the lens cells of the plurality of lens cells of the second surface 810b. In embodiments, the width and height of each of the lens cells of the plurality of lens cells of the first and/or second surfaces 810a and 810b may independently be between 0.2 millimeters to 1.2 millimeters. In embodiments, the movable MLA 810 may be a plastic material such as Zeonex, Acrylic, Polycarbonate, K26R, E48R or another plastic material. In embodiments, the movable MLA 810 may be a glass material or other optical material able to transmit light. In embodiments, the movable MLA 810 has an index of refraction from 1.45 to 1.8 and an Abbe value of 25 to 65. In embodiments, each of the lenses of the plurality of lens cells of the first and/or second surfaces 810a and 810b have an effective focal distance of approximately 0.2±0.05 millimeters to 1.0±0.05 millimeters. In embodiments, the lens surface of each of the lenses of the plurality of lenses may be spherical, aspherical, toroidal, or free form. In a preferred embodiment, the movable MLA 810 has a positive optical power. In embodiments, the lens surface of each of the lenses of the plurality of lenses may be a toroidal shape with X and Y radii of 0.2 to 2.0 millimeters. In embodiments, the thickness of the movable MLA 810 is between 0.2 millimeters and 1.2 millimeter. In embodiments, the first and second surfaces 810a and 810b of the movable MLA 810 may be a same material, or the first surface 810a of the movable MLA 810 may be a first material and the second surface 810b of the movable MLA 810 may be a second material that is different from the first material. In embodiments, the first surface 810a of the movable MLA 810 may be a planar surface and the second surface 810b of the movable MLA 810 may include a plurality of lens cells, or the first surface 810a of the movable MLA 810 may be a surface having a plurality of lens cells and the second surface 810b of the movable MLA 810 may be a planar surface. In embodiments, both the first surface 810a and the second surface 810b of the movable MLA 810 may be a planar surface.

In embodiments, a motor 816 is coupled to the movable MLA 810 configured to move the movable MLA 810 along the optical axis B between the first fixed MLA 806 and the second fixed MLA 814 to adjust the illumination FOV of the optical assembly 800 of the adaptable illumination system 150. In embodiments, the motor 416 may be an actuator, a voice coil motor, a piezoelectric device, a microelectromechanical systems (MEMS) motor, or another compact motor. In embodiments, the motor 416 may be configured to move the movable MLA 414 a travel distance of between 0.2 millimeters and 3 millimeters. In embodiments, the motor 816 may be configured to move the movable MLA 810 a travel distance of between 0.2 millimeters and 1 millimeter. At a given separation distance 820 between the second surface 806b of the first fixed MLA 806 and the first surface 810a of the movable MLA 810, the adaptable illumination system 150 exhibits a first illumination FOV, and at a different distance 820, the illumination system 150 exhibits a different illumination FOV. For example, as the distance 820 between the movable MLA 810 and the first fixed MLA 806 is increased the illumination FOV narrows.

The second fixed MLA 814 is disposed along the optical axis B configured to receive the light from the movable MLA 810. The second fixed MLA 814 has a first surface 814a disposed along the optical axis B configured to receive the light from the movable MLA 810 and a second surface 814b disposed along the optical axis B configured to provide the light to the target. The first surface 814a of the second fixed MLA 814 is a surface having a plurality of lens cells and the second surface 814b of the second fixed MLA 814 is a planar surface. In embodiments, the plurality of lens cells is a plurality of concave lens cells. Each lens cell of the plurality of concave lens cells may have a size of approximately 0.6±0.05 by 0.7±0.05 millimeters, 0.5±0.05 by 0.6±0.05 millimeters, 0.4±0.05 millimeters by 0.5±0.05 millimeters, 0.3±0.05 millimeters by 0.4±0.05 millimeters, 0.2±0.05 by 0.3±0.05 millimeters, 0.1±0.05 by 0.2±0.05 millimeters. In embodiments, lens cells of the plurality of lens cells may have equal dimensions, for example, each lens cell may have a size of 0.1±0.05 by 0.1±0.05 millimeters, 0.2±0.05 by 0.2±0.05 millimeters, 0.3±0.05 by 0.3±0.05 millimeters, or dimensions greater than 0.3 millimeters. In embodiments, the width and height of each of the lens cells of the plurality of lens cells may independently be between 0.2 millimeters to 1.2 millimeters. In embodiments, the second fixed MLA 814 may be a plastic material such as Zeonex, Acrylic, Polycarbonate, K26R, E48R or another plastic material. In embodiments, the second fixed MLA 814 may be a glass material or other optical material able to transmit light. In embodiments, the second fixed MLA 814 has an index of refraction from 1.45 to 1.8 and an Abbe value of 25 to 65. In embodiments, each of the lenses of the plurality of lens cells have an effective focal distance of approximately 0.2±0.05 millimeters to 1.0±0.05 millimeters. In embodiments, the lens surface of each of the lenses of the plurality of lenses may be spherical, aspherical, toroidal, or free form. In a preferred embodiment, the second fixed MLA 806 has a negative optical power. In embodiments, the lens surface of each of the lenses of the plurality of lenses may be a toroidal shape with X and Y radii of 0.2 to 2.0 millimeters. In embodiments, the thickness of the first fixed MLA 806 is between 0.2 millimeters and 1.2 millimeter.

In embodiments, the first and second surfaces 814a and 814b of the second fixed MLA 814 may be a same material, or the first surface 814a of the second fixed MLA 814 may be a first material and the second surface 814b of the second fixed MLA 814 may be a second material that is different than the first material. In embodiments, the first surface 814a of the second fixed MLA 814 may be a planar surface and the second surface 814b of the second fixed MLA 814 may have a plurality of lens cells. In embodiments, both the first surface 814a and the second surface 814b of the second fixed MLA 814 may be a planar surface, or both the first surface 814a and the second surface 814b may be a surface having a plurality of lens cells. In embodiments, the overall length of the optical assembly 800 along the optical axis B from the illumination source 802 to the second surface 814b of the second fixed MLA 814 is less than 25 mm. In embodiments, the overall length of the three MLA elements along the optical axis B from the first surface 806a of the first fixed MLA 806 to the second surface 814b of the second fixed MLA 814 may be 3 millimeters, between 1 and 5 millimeters, or less than 7 millimeters.

In embodiments, a motor may be physically coupled to the second fixed MLA 814 to allow the second fixed MLA 814 to translate and therefore be a second movable MLA. The motor physically coupled to the second fixed MLA 814 may be configured to move the second fixed MLA 814 along the optical axis B to change the illumination FOV of the adaptive illumination system 150. In embodiments, the motor 416 may be an actuator, a voice coil motor, a piezoelectric device, a microelectromechanical systems (MEMS) motor, or another compact motor. In embodiments, the motor 416 may be configured to move the movable MLA 414 a travel distance of between 0.2 millimeters and 3 millimeters. In embodiments, the motor may be configured to move the second fixed MLA 814 a travel distance of between 0.2 millimeters and 1 millimeter FIGS. 9A, 10A, and 11A are cross-sectional side views of the optical assembly 800 of FIG. 8 having a distance 820 of 0 millimeters, 0.25 millimeters, and 0.5 millimeters respectively. The distance 820 is measured as a distance of motion of the motor 816. A distance 820 of 0 millimeters as described here corresponds to a separation of 0.2 millimeters between the second surface 806b of the first fixed MLA 806 and the first surface 810a of the movable MLA 810. Therefore, distances 820 of 0.25 millimeters and 0.5 millimeters correspond to separations of 0.45 millimeters and 0.7 millimeters, respectively, between the second surface 806b of the first fixed MLA 806 and the first surface 810a of the movable MLA 810. In embodiments, the motor 816 may be configured to allow the movable MLA 810 to physically come into contact with the first fixed MLA 806 and/or physically in contact with the second fixed MLA 814. In embodiments, the motor 816 may be configured to move the movable MLA 810 to any range of distances 820 to provide a desired illumination FOV for illuminating the target.

FIGS. 9B, 10B, and 11B are images of the illumination field of the optical configurations of the optical assemblies 800 of FIGS. 9A, 10A, and 11A respectively, at a distance of 200 millimeters from the collimating lens along the optical axis, B. FIGS. 9C, 10C, and 11C are the illumination field angles in polar coordinates for the optical configurations of the optical assemblies 800 shown in FIGS. 9A, 10A, and 11A respectively. As described herein, the illumination field angles shown in FIGS. 9C, 10C, and 11C may be considered to define the illumination FOV. The light intensity shown in FIGS. 9C, 10C, and 11C is normalized to one. The polar illumination plots illustrate the far field light radiant intensity distribution, which represents how much light propagates within a particular angle segment. The Y-axis has a maximum of 1.0 which represents the normalized light radiant intensity within an angle segment. The FOVs represented in FIGS. 9C, 10C, and 11C were defined as the 0.5 (i.e., 50%) light intensity drop off of the illumination. As shown by the FIGS. 9A-9C, 10A-10C, and 11A-11C, the illumination FOV decreases with increased distance 820 between the first fixed MLA 806 and the movable MLA 810. The illumination FOV is tuned from approximately 46 degrees in FIG. 9C, to approximately 24 degrees in FIG. 11C. Therefore, the optical configuration of FIG. 11A allows for illumination of a target at further distances than either of the optical configurations of FIG. 10A or 9A, and the configuration of FIG. 9A may provide for more efficient imaging or reading of a target that is closer to the adaptive illumination system 150. In embodiments, the illumination FOV may be tuned from 10 to 20 degrees, 20 to 40 degrees, 30 to 60 degrees, to less than 50 degrees, to greater than 60 degrees, or to any range of values between 4 and 80 degrees.

The above description of the accompanying drawing of FIG. 3 is one example of the systems and methods described herein. Alternative implementations of the examples presented include one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

I claim:

1. An optical assembly for an adaptive illumination system, the optical assembly comprising:
an illumination source configured to provide light along an optical axis to provide illumination to a target, wherein the illumination has an illumination full field angle;
a collimating lens disposed along the optical axis and configured to receive the light from the illumination source and further configured to collimate the light;
a fixed multiple lens array disposed along the optical axis and configured to receive the light from the collimating lens; and
a movable multiple lens array disposed along the optical axis and configured to receive the light from the fixed lens array, wherein the position of the movable multiple lens array is adjustable and the position of the movable lens array may be adjusted to change the illumination full field angle.

2. The optical assembly of claim 1, further comprising a motor physically coupled to the movable multiple lens array and configured to adjust the position of the movable multiple lens array.

3. The optical assembly of claim 2, wherein the motor is a voice coil motor.

4. The optical assembly of claim 1, wherein the movable multiple lens array has a travel distance of between 0.2 and 1 millimeter.

5. The optical assembly of claim 1, wherein the illuminating full field angle can be changed from 24 degrees to 46 degrees.

6. The optical assembly of claim 1, wherein the illuminating full field angle is less than 50 degrees.

7. The optical assembly of claim 1, wherein the illumination source is a light emitting diode.

8. The optical assembly of claim 1, wherein the collimating lens has a first surface along the optical axis and a second surface along the optical axis and wherein the first surface is a planar surface and the second surface is a convex surface having a positive optical power, index of refraction between 1.4 and 2, and am Abbe value of between 20 and 70.

9. The optical assembly of claim 1, wherein the fixed multiple lens array comprises a first surface along the optical axis and a second surface along the optical axis, and wherein the first surface is a planar surface and the second surface comprises a plurality of lens cells.

10. The optical assembly of claim 9, wherein the plurality of lens cells comprises a plurality of convex lens cells having a lens cell size of approximately 0.4 millimeters by 0.5 millimeters.

11. The optical assembly of claim 1, wherein the fixed multiple lens array comprises a plastic material.

12. The optical assembly of claim 1, wherein the movable multiple lens array comprises a first surface along the optical axis and a second surface along the optical axis, and wherein the first surface comprises a plurality of lens cells and the second surface comprises a planar surface.

13. The optical assembly of claim 12, wherein the plurality of lens cells comprises a plurality of convex lens cells having a lens cell size of approximately 0.4 millimeters by 0.5 millimeters.

14. The optical assembly of claim 1, wherein the movable multiple lens array comprises a plastic material.

15. The optical assembly of claim 1, further comprising a third multiple lens array disposed along the optical axis configured to receive the light from the movable multiple lens array, and wherein the third multiple lens array is further configured to provide the light to the target.

16. The optical assembly of claim 15, wherein the third fixed multiple lens array comprises a first surface along the optical axis and a second surface along of the optical axis, and wherein the first surface comprises a plurality of concave lenses and the second surface comprises a planar surface.

17. The optical assembly of claim 15, further comprising a motor physically coupled to the third multiple lens array configured to adjust the position of the third multiple lens array.

18. The optical assembly of claim 17, wherein the motor is an actuator, a voice coil motor, a piezoelectric device, or a microelectromechanical systems (MEMS) motor.

19. The optical assembly of claim 1, wherein the movable lens array comprises a first surface along the optical axis and a second surface along the optical axis, and wherein the first surface of the movable lens array comprises a plurality of convex lenses and the second surface of the movable lens array comprises a plurality of convex lenses.

20. The optical assembly of claim 1, wherein the target is one of a 1D barcode, 2D barcode, QR code, UPC code, or indicia indicative of an object of interest.

21. The optical assembly of claim 1, wherein the illuminating full field angle can be changed from 16 degrees to 42 degrees.

* * * * *